(No Model.) 2 Sheets—Sheet 1.
J. C. WILSON & B. J. NOYES.
MUNICIPAL SIGNAL APPARATUS.
No. 433,504. Patented Aug. 5, 1890.
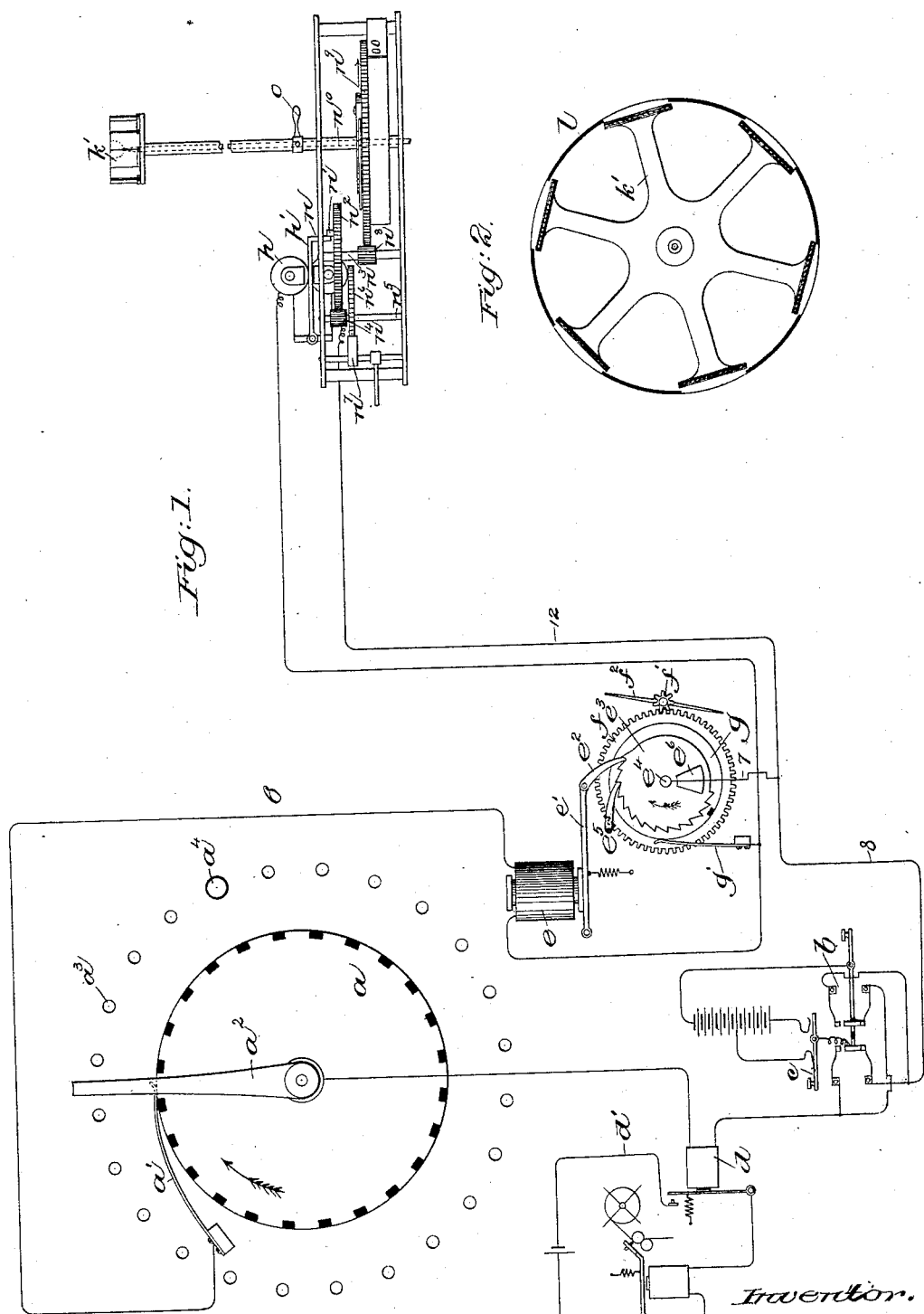

(No Model.) 2 Sheets—Sheet 2.
J. C. WILSON & B. J. NOYES
MUNICIPAL SIGNAL APPARATUS.
No. 433,504. Patented Aug. 5, 1890.
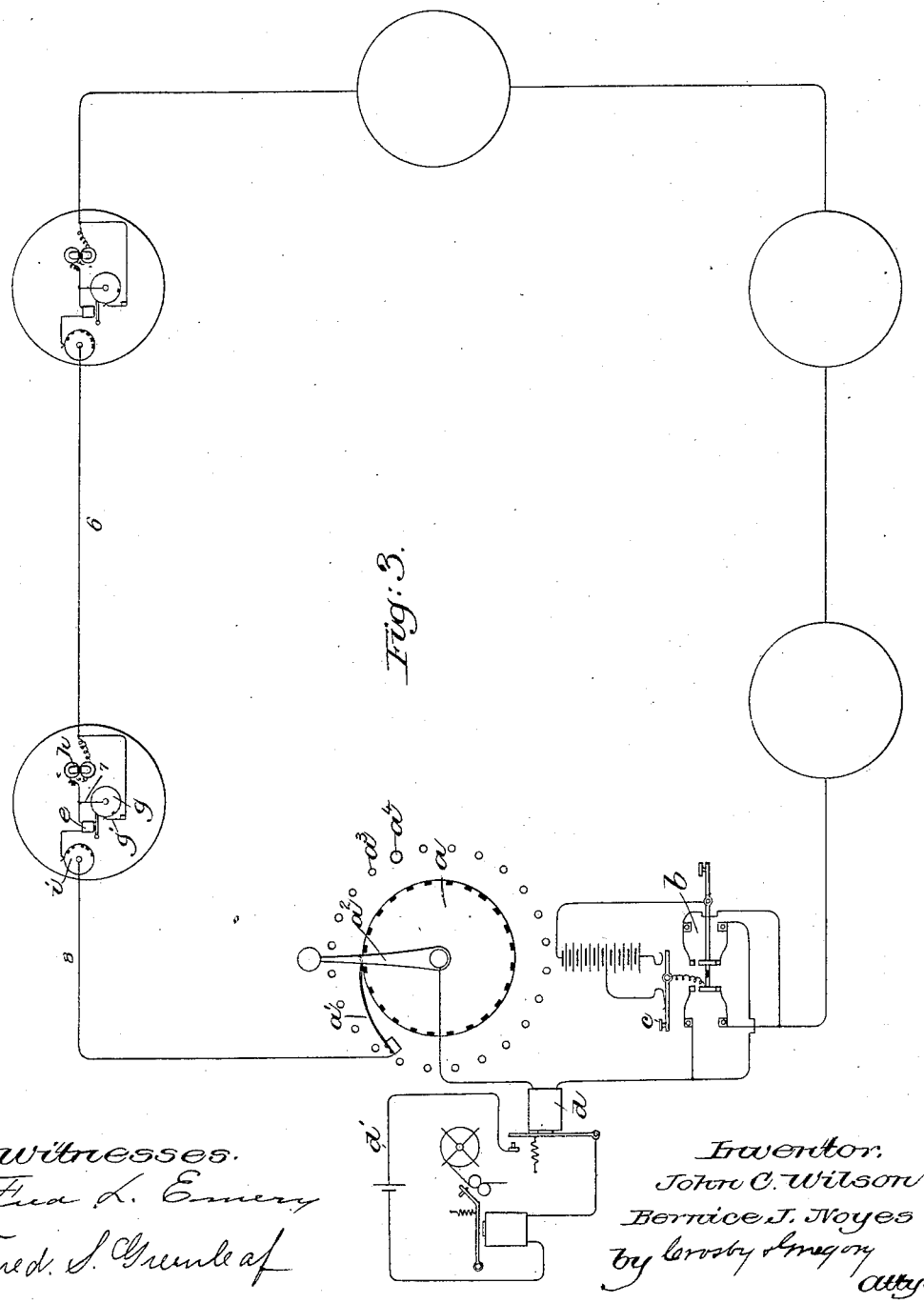

UNITED STATES PATENT OFFICE.

JOHN C. WILSON AND BERNICE J. NOYES, OF BOSTON, MASSACHUSETTS, ASSIGNORS TO THE MUNICIPAL SIGNAL COMPANY, OF PORTLAND, MAINE.

MUNICIPAL SIGNAL APPARATUS.

SPECIFICATION forming part of Letters Patent No. 433,504, dated August 5, 1890.

Application filed September 9, 1887. Serial No. 249,229. (No model.)

*To all whom it may concern:*

Be it known that we, JOHN C. WILSON and BERNICE J. NOYES, both of Boston, county of Suffolk, and State of Massachusetts, have invented an Improvement in Municipal Signal Apparatus, of which the following description, in connection with the accompanying drawings, is a specification, like letters on the drawings representing like parts.

This invention is an improvement upon application for Letters Patent, Serial No. 209,304, filed July 28, 1886, by J. C. Wilson, and has for its object to provide a mechanical unison for the step-by-step devices, and also to provide a visual indicator of a different construction.

In accordance with this invention the step-by-step device is included in a shunt of a visual indicating device, said step-by-step device consisting of a wheel having for the main portion of its periphery ratchet-teeth, the remaining portion of its periphery being made smooth. A weight or counter-balance is attached near to the periphery of the said ratchet-wheel, which normally keeps the same in a definite position, termed "unison-point," by gravity. The wheel is rotated step by step by a pawl moved by an actuating-magnet, lifting the weight until it passes its center of gravity, after which the weight in falling restores the wheel to its normal position, the pawl at such time passing over the smooth part of the wheel. An escapement or fan-regulator is also provided for regulating the speed of the ratchet-wheel, particularly during the movement given to it by the weight. A circuit-controlling device is governed by said step-by-step device, it opening and closing a shunt-circuit for the visual indicating device. The ratchet-toothed wheel is provided with as many teeth as there are signaling-stations upon the circuit, and at the main station the circuit-controlling device for effecting the movements of the actuating-magnets of the step-by-step devices is adapted to change the condition of the circuit several times in addition to the number of signaling-stations on the line, so that should any one or more of the step-by-step devices lag behind these additional impulses will bring it up, so as to cause the weight for each ratchet-wheel to pass beyond its center of gravity, so it may fall to unison-point. The length of time consumed by the ratchet-wheels of the step-by-step devices in returning to unison-point by the weight is more than the time required by the circuit-controlling device at the main station to transmit the additional impulses, so that none of the step-by-step devices will be started by any of the additional impulses.

The visual indicating device consists of a light—as, for instance, a gas-jet or street-lamp—and a stationary globe inclosing the light, it having opaque and transparent spaces arranged alternately, or it may be a series of opaque portions or sides, and a revolving globe is placed within the stationary globe, said revolving globe having a series of red, green, or other colored portions, and a series of transparent spaces arranged alternately, or it may have only a series of colored portions arranged at definite distances apart corresponding in position with the position of the opaque portions of the stationary globe, so that when the revolving globe is in one position the colored portions are concealed by the opaque portions of the stationary globe, and when in another position the colored portions register with the transparent or open spaces or portions of the stationary globe, and are therefore discernable. The revolving globe is fixed to a shaft, which is revolved a short distance by a motor mechanism set in operation by a normally-shunted electrical device, it preferably being a polarized magnet requiring an impulse to effect its operation, which differs from the impulses employed to effect the operation to the actuating-magnet of the step-by-step device.

Owing to other signaling devices which are included in the circuit, the independent operation of which is required, the actuating-magnet of the step-by-step device is designed to require a strong current to effect its operation, and means are provided at the main station for throwing into the line additional battery when it is desired to operate these devices.

Figure 1 shows an electric circuit containing in diagram the instruments at the main station and also at the sub-station; Fig. 2, a top view of the stationary and rotatable globes, and Fig. 3 a diagram of the circuit containing the signal transmitter and receiving instruments at the main and sub-stations, respectively.

The main or central station contains a circuit-controlling device (shown as a break-wheel $a$) having as many notches as there are to be signal-boxes upon the line, and also several additional notches, for purposes to be hereinafter described. A pen $a'$ bears upon the periphery of the break-wheel $a$. The break-wheel $a$ is rotated by any suitable motor, (not shown,) which is adapted to be wound by a starting-lever, (not shown,) which when released effects the rotation of the break-wheel during the time that the starting-lever is returning to its normal position, such form of motor being very common in ordinary district call-boxes and the like. A pointer $a^2$ or arm is fixed to the shaft carrying the break-wheel $a$, which is moved over a dial composed of a series of holes, as $a^3$, into any one of which a plug $a^4$ may be placed, said plug lying in the path of movement of the pointer $a^2$ to stop the rotation of the break-wheel at any point desired, and upon removing the said plug the break-wheel completes its rotation. The holes $a^3$ are numbered to correspond with the signal-boxes upon the line, and are arranged to correspond in position with the notches of the break-wheel. The main station also contains a pole-changing key $b$ and a key $c$. The latter, when depressed, throws into the line additional battery. A receiving-relay $d$ is also located at the main station, the armature of which closes a local circuit $d'$, containing a local battery and a register of any well-known construction, said receiving-relay being responsive to the signals transmitted from the signal-boxes to the main station.

Each signal-box at the sub-station is provided with a multiple-signal-transmitting device $i$ of any well-known construction—such, for instance, as that shown in the Patent No. 320,032. The signals transmitted by said transmitter are received by the receiving-relay $d$. The sub-stations also contain an actuating-magnet $e$, responsive only to a strong current, thereby requiring operation of the key $c$ at the main office to throw additional battery into the circuit.

The armature $e'$ of the actuating-magnet $e$ carries a push-pawl $e^2$, which engages the teeth of a ratchet-wheel $e^3$, fixed to a shaft $e^4$, said ratchet-wheel only having teeth for the main portion of its periphery, and corresponding in number with the number of boxes upon the line, the remaining portion of the said ratchet-wheel being made smooth. A retaining-pawl $e^5$ is fixed to a suitable stationary frame-work or stand to engage the teeth of the ratchet-wheel and prevent any backward rotation of the same. The ratchet-wheel is provided on its periphery with a weight or counter-balance $e^6$ at the point where the series of ratchet-teeth terminate, said weight tending to normally keep the ratchet-wheel in a definite position, whereby the actuating-pawl is in engagement with the first tooth of the series. A toothed wheel $f$ is also secured to the shaft $e^4$, meshing with the pinion $f'$, fixed to a shaft carrying a fan-regulator $f^2$, to thereby regulate the speed of rotation of the ratchet-wheel, which is particularly desired during the time said ratchet-wheel is moved by the weight, it being understood that the ratchet-wheel is rotated by the actuating-pawl step by step, raising the weight until said weight passes its center of gravity, after which the ratchet-wheel completes its rotation by the weight or counter-balance, the actuating-pawl at such time passing over the smooth part of the wheel. A circuit-controlling wheel $g$ is also fixed to the shaft $e^4$, a pen $g'$ normally bearing upon said wheel $g$. The wheel $g$ is provided with a single insulated space or notch located in each box at a different distance from its starting-point, so that a different number of movements of the actuating-pawl are required to bring the notch beneath the pen $g'$. The sub-station also contains a visual indicating device included in a normally-closed shunt-circuit 12. The current normally passes over the wire 6, pen $g'$, wheel $g$, the shaft $e^4$, wire 7, and the wire 8, so that the shunt is opened when the pen $g'$ rests upon the notch or insulated part of the wheel $g$.

The visual indicating device consists of a normally-wound spring-motor and an electro-magnetic device for releasing it, the said device being herein shown as a polarized magnet $h$, to thereby require movements of the pole-changing key $b$ to effect its operation, and can only be effected when the shunt is opened. The armature $h'$ of the magnet $h$ has at its outer end a pin $n$, which engages a stop $n'$, projecting from the wheel $n^2$, fixed to a shaft $n^3$. The wheel $n^2$ engages a pinion $n^4$, fixed to a shaft $n^5$, which shaft also carries a toothed wheel $n^6$, which co-operates with a suitable escapement $n^7$.

The shaft $n^3$ carries a pinion $n^8$, which engages a toothed wheel $n^9$, fixed to the winding-shaft $n^{10}$ of the motor, said winding-shaft being extended upward and having fixed to it at the top a globe $k'$, containing alternate colored and transparent portions or spaces. The globe $k'$ is inclosed by a stationary globe or drum $l$, containing similarly-arranged opaque and transparent or open spaces, so that when the revolving globe is in one position the colored lights or portions are concealed by the opaque portions of the stationary globe, or when in another position are discernible.

A light—such, for instance, as an ordinary gas-jet or lamp—is concealed by the globes. Each globe is herein shown as comprising six colored or opaque portions and six open or transparent spaces, so that when displayed it may be seen from any point. Yet it is obvious that any other number may be employed. When the globe is thus divided into twelve sections, the toothed wheel $n^9$ will be made to move one-twelfth of a revolution each time.

When it is desired to set the visual indicator at any particular sub-station, the key $c$ is pressed to throw additional battery into the line and the controlling device $a$ set in operation, the plug $a^4$ being inserted in the hole corresponding with the number of the box required. The actuating-magnet $e$ will thus effect the rotation of the ratchet-wheels of all the boxes step by step a given number of teeth, and at the particular box required the pen $g'$ will lie upon the notch or insulated portion of the wheel $g$, thereby opening the shunt. The pole-changing key $d$ is then operated and the magnet $h$ effects the release of the motor controlling the rotation of the globe. After one of the indicators have been set the plug $a^4$ of the circuit-controlling device at the main station is removed and the break-wheel $a$ completes its rotation, transmitting a sufficient number of impulses to rotate all the ratchet-wheels, so that the weights or counter-balances may pass the center of gravity and fall. Should any of the ratchet-wheels lag behind one or more steps, the additional impulses produced by the break-wheel $a$ will act to bring them up. The rotation of the break-wheel $a$ has time to cease before the ratchet-wheels have completed their rotation or resumed their normal position, so that no impulses can be transmitted to again start the wheels. The rotatable globe is returned to its normal position by the hand-lever $o$.

It is obvious that as a signal for calling the attention of an officer the colored globe may be turned to register with the transparent or open spaces, and thereby show a colored light, or the colored light may be normally displayed and be shut off or darkened. It is also obvious that other devices may be employed to individualize the light than that herein shown, and, furthermore, the devices herein employed for individualizing the light may be used for other purposes.

We do not herein jointly claim a police-signal system comprising an electric circuit and a series of sub-stations, each containing a signal-light combined with a central station containing a controlling device for operating the signal-lights independently, whereby the appearance of any light upon the circuit may be changed, as the same forms the subject-matter of an application of J. C. Wilson, Serial No. 252,335, filed October 14, 1887.

We do not herein claim the combination of an electric circuit, a main station, and a series of sub-stations therein, each sub-station containing a light-signal, an electro-magnet controlling its operation, and an electro-magnetically-movable step-by-step individual call-switch controlling the circuit of the said light-signal-operating magnet, and a circuit-changing device at the main station by which said switches are controlled, as the same is not jointly our invention.

We claim—

1. In an electric circuit, sub-stations, each containing a light-signal, a normally-wound motor mechanism for operating it, a controlling-magnet for releasing the said motor mechanism, a switch normally shunting out said controlling-magnet, a step-by-step device for moving said switch, and an actuating-magnet for moving said step-by-step device, combined with a main station containing an automatic circuit-changer for the actuating-magnets of the step-by-step devices, and another circuit-changing device for transmitting an impulse for effecting the controlling-magnet of the motor mechanism, substantially as described.

2. In an electric circuit, several sub-stations, each containing a light-signal and an electro-magnetically-movable step-by-step device for controlling it, said step-by-step device comprising a pawl-and-ratchet wheel and a weight for bringing the instrument to unison after the last tooth of the ratchet has passed the pawl, combined with an automatic circuit-changer at the main station arranged to change the condition of the circuit at each operation more times than there are teeth on the ratchet-wheel to insure bringing the latter to unison-point, substantially as described.

In testimony whereof we have signed our names to this specification in the presence of two subscribing witnesses.

JOHN C. WILSON.
BERNICE J. NOYES.

Witnesses:
G. W. GREGORY,
F. L. EMERY.